(12) United States Patent
Langhammer

(10) Patent No.: US 8,713,081 B2
(45) Date of Patent: *Apr. 29, 2014

(54) LOOK UP TABLE (LUT) STRUCTURE SUPPORTING EXCLUSIVE OR (XOR) CIRCUITRY CONFIGURED TO ALLOW FOR GENERATION OF A RESULT USING QUATERNARY ADDERS

(71) Applicant: Altera Corporation, San Jose, CA (US)

(72) Inventor: Martin Langhammer, Salisbury (GB)

(73) Assignee: Altera Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/865,891

(22) Filed: Apr. 18, 2013

(65) Prior Publication Data

US 2013/0311534 A1  Nov. 21, 2013

Related U.S. Application Data

(63) Continuation of application No. 12/732,104, filed on Mar. 25, 2010, now Pat. No. 8,447,798.

(51) Int. Cl.
  *G06F 7/42* (2006.01)
(52) U.S. Cl.
  USPC .......................... 708/235; 708/493; 708/300
(58) Field of Classification Search
  USPC ......................................... 708/235, 300, 493
  See application file for complete search history.

(56) References Cited

U.S. PATENT DOCUMENTS

| | | | | |
|---|---|---|---|---|
| 5,910,904 A | * | 6/1999 | Uramoto | 708/300 |
| 6,301,600 B1 | * | 10/2001 | Petro et al. | 708/670 |
| 6,334,136 B1 | * | 12/2001 | Blomgren et al. | 708/710 |
| 7,558,812 B1 | | 7/2009 | Padalia et al. | |
| 7,562,106 B2 | * | 7/2009 | Lablans | 708/493 |
| 7,565,388 B1 | | 7/2009 | Baeckler et al. | |
| 8,345,873 B2 | * | 1/2013 | Lablans | 380/255 |
| 2003/0001613 A1 | | 1/2003 | Nakaya | |
| 2006/0031278 A1 | | 2/2006 | Lablans | |
| 2009/0092250 A1 | | 4/2009 | Lablans | |

FOREIGN PATENT DOCUMENTS

KR  20030087816  11/2003

OTHER PUBLICATIONS

WO patent application No. PCT/US2011/029427, International Search Report and Written Opinion mailed Oct. 27, 2011.
CN Office Action dated May 30, 2013 issued in Chinese Application No. 201180015726.7.
Navi, K. et al., "A Six Transistors Full Adder," World Applied Sciences Journal 4 (1): 142-149, 2008, ISSN 1818-4952.
Brent R. et al.; "A regular lay-out for parallel adders." IEEE Transactions on Computers C-31,1982.

* cited by examiner

*Primary Examiner* — Tammara Peyton
(74) *Attorney, Agent, or Firm* — Weaver Austin Villeneuve & Sampson LLP

(57) ABSTRACT

A lookup table structure having multiple lookup tables is configured to include a quaternary adder. In particular examples, an adaptive logic module (ALM) including a fracturable lookup table (LUT) is configured to include a quaternary (4-1) adder. In some examples, only an XOR gate, an AND gate, two single bit 2-1 multiplexers, and minor connectivity changes to a LUT structure supporting a ternary (3-1) adder are needed to support 4-1 adders. Binary (2-1) and ternary adders are still supported using the original signal flows, as the ternary adder feature can be easily multiplexed out.

21 Claims, 12 Drawing Sheets

Figure 2A

|  | A4 | A3 | A2 | A1 |
|---|---|---|---|---|
|  | B4 | B3 | B2 | B1 |
|  | C4 | C3 | C2 | C1 |
|  | SM4 | SM3 | SM2 | SM1 |
| CY4 | CY3 | CY2 | CY1 |  |
| Y5 | Y4 | Y4 | Y2 | Y1 |

Figure 2B

|  | 1 | 0 | 1 | 1 | A |
|---|---|---|---|---|---|
|  | 0 | 1 | 1 | 1 | B |
|  | 1 | 0 | 1 | 0 | C |
|  | 0 | 1 | 1 | 0 | SM |
| 1 | 0 | 1 | 1 |  | CY |
| 1 | 1 | 1 | 0 | 0 | Y |

Figure 4A

|  | A4 | A3 | A2 | A1 |
|---|---|---|---|---|
|  | B4 | B3 | B2 | B1 |
|  | C4 | C3 | C2 | C1 |
|  | SMA4 | SMA3 | SMA2 | SMA1 |
| CYA4 | CYA3 | CYA2 | CYA1 |  |
|  | D4 | D4 | D2 | D1 |
|  | SMB4 | SMB3 | SMB2 | SMB1 |
| CYB4 | CYB3 | CYB2 | CYB1 |  |
| Y5 | Y4 | Y3 | Y2 | Y1 |

Figure 4B

|  | 0 | 0 | 1 | 1 | A |
|---|---|---|---|---|---|
|  | 0 | 1 | 1 | 1 | B |
|  | 1 | 0 | 0 | 1 | C |
|  | 1 | 1 | 0 | 1 | SMA |
| 0 | 0 | 1 | 1 |  | CYA |
|  | 1 | 0 | 1 | 0 | D |
|  | 0 | 0 | 0 | 1 | SMB |
| 1 | 1 | 1 | 0 |  | CYB |
| 1 | 1 | 1 | 0 | 1 | Y |

Figure 8A

| SMA$_x$ | CYA$_{x-1}$ | D$_x$ | CYB$_x$ |
|---|---|---|---|
| 0 | 0 | 0 | 0 |
| 0 | 0 | 1 | 0 |
| 0 | 1 | 0 | 0 |
| 0 | 1 | 1 | 1 |
| 1 | 0 | 0 | 0 |
| 1 | 0 | 1 | 1 |
| 1 | 1 | 0 | 1 |
| 1 | 1 | 1 | 1 |

Figure 8B

| Xsel | CYA$_{x-1}$ | D$_x$ | CYB$_x$ |
|---|---|---|---|
| 0 | 0 | 0 | 0 |
| 1 | 0 | 1 | 0 |
| 0 | 1 | 0 | 0 |
| 1 | 1 | 1 | 1 |
| 1 | 0 | 0 | 0 |
| 0 | 0 | 1 | 1 |
| 1 | 1 | 0 | 1 |
| 0 | 1 | 1 | 1 |

LOOK UP TABLE (LUT) STRUCTURE SUPPORTING EXCLUSIVE OR (XOR) CIRCUITRY CONFIGURED TO ALLOW FOR GENERATION OF A RESULT USING QUATERNARY ADDERS

CROSS REFERENCE TO RELATED APPLICATION

This application is a continuation of prior application Ser. No. 12/732,104 filed on Mar. 25, 2010, entitled LOOK UP TABLE (LUT) STRUCTURE SUPPORTING EXCLUSIVE OR (XOR) CIRCUITRY CONFIGURED TO ALLOW FOR GENERATION OF A RESULT USING QUATERNARY ADDERS, now pending, the disclosure of which is incorporated by reference herein in its entirety.

TECHNICAL FIELD

The present disclosure relates to a lookup table structure that supports quaternary adders.

DESCRIPTION OF RELATED ART

Programmable chips such as programmable logic devices (PLDs), complex PLDs (CPLDs), programmable array logic (PALs), programmable logic arrays (PLAs), field PLAs (FPLAs), erasable PLDs (EPLDs), and field programmable gate arrays (FPGAs), provide a variety benefits including design flexibility and reconfigurability. Some fixed integrated circuits including Application Specific Integrated Circuits (ASICs) can also include programmable elements. Programmable chips include look up tables (LUTs) such as adaptive LUTs (ALUTs), logic array blocks (LABs), logic cells, or configurable logic blocks (CLBs) that can be configured to perform logic functions on a number of input variables.

It is sometimes beneficial to include logic on programmable chips to perform frequently executed operations more efficiently than look up tables allow. The techniques and mechanisms of the present invention provide a lookup table structure that allows efficient implementation of quaternary adders on a programmable chip.

BRIEF DESCRIPTION OF THE DRAWINGS

The disclosure may best be understood by reference to the following description taken in conjunction with the accompanying drawings, which illustrate particular embodiments of the present invention.

FIGS. 2A-2B illustrate ternary addition and associated bit positions.

FIGS. 4A-4B illustrate quaternary addition and associated bit positions.

FIG. 8A-8B illustrate a lookup table structure.

DESCRIPTION OF PARTICULAR EMBODIMENTS

Figure 1:
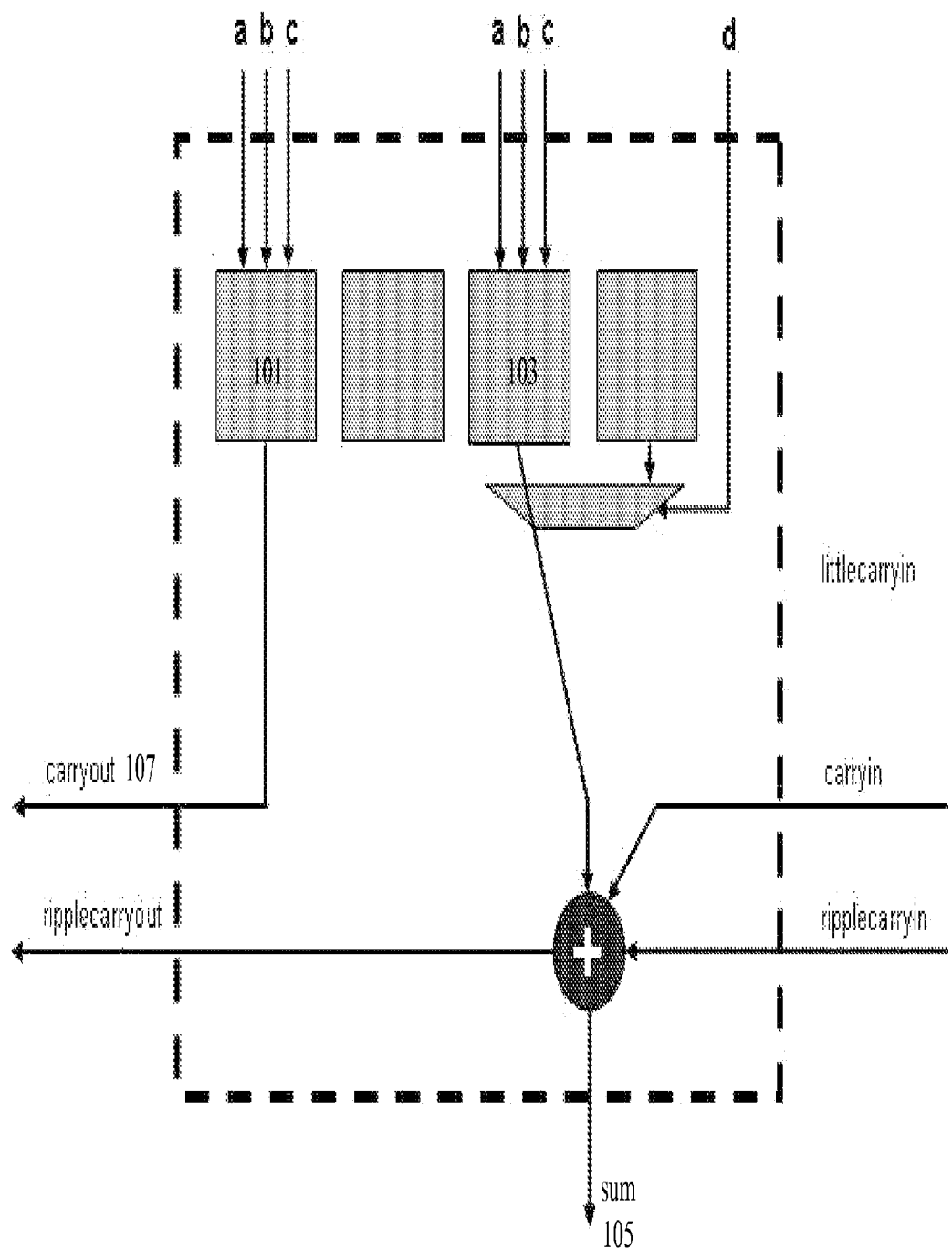
FIG. 1 illustrates one example of a ternary adder.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of particular look up tables such as look up tables in an adaptive logic module (ALM). However, it should be noted that the techniques of the present invention can be applied to a number of different lookup table architectures. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a processor is used in a variety of contexts. However, it will be appreciated that multiple processors can also be used while remaining within the scope of the present invention unless otherwise noted. Furthermore, the techniques and mechanisms of the present invention will sometimes describe two entities as being connected. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

A lookup table structure having multiple lookup tables is configured to include a quaternary adder. In particular examples, an adaptive logic module (ALM) including a fracturable lookup table (LUT) is configured to include a quaternary (4-1) adder. In some examples, only an XOR gate, an AND gate, two single bit 2-1 multiplexers, and minor connectivity changes to a LUT structure supporting a ternary (3-1) adder are needed to support 4-1 adders. Binary (2-1) and ternary adders are still supported using the original signal flows, as the ternary adder feature can be easily multiplexed out.

Example Embodiments

Lookup tables on programmable chips provide a range of benefits including design flexibility and reconfigurability. However, it can be beneficial to include hardcoded elements such as adders and multiplexers on programmable chips as well to improve performance and efficiency. According to various embodiments, a quaternary (4-1) adder can be efficiently included using a LUT structure with the addition of minimal logic. In particular embodiments, an XOR gate, an AND gate, and two single bit 2-1 multiplexers are included in a LUT already supporting a ternary (3-1) adder to allow the LUT structure to also support a 4-1 adder.

FIG. 1 illustrates one example of a ternary adder implemented using an ALM. According to various embodiments, a ternary adder can be included in an ALM having four lookup tables. A ternary adder supports the addition of three simultaneous inputs. The ternary adder is implemented as a 3-2 compressor, followed by a ripple carry adder. The two outputs of the 3-2 compressor are the carry bit 107 and a sum bit. The input of the adder generates a sum bit 105. The sum and carry vectors need to be added by a carry propagate adder, in this case the embedded ripple carry adder in the LAB. The sum bit is an XOR of the three inputs determined using lookup table 103. The carry bit is a majority decode of the three bits determined using lookup table 101. The carry bit is '0' if there are less than two '1' bits in the three input bits.

FIG. 2A illustrates compression and addition operations. There are three numbers, A, B, and C each having four bits, A1, A2, A3, A4, B1, B2, B3, B4, C1, C2, C3, and C4 respectively. The numerals denote bit positions (ranks) The sum and carry vectors are named SM and CY having bits SM1, SM2, SM3, SM4, CY1, CY2, CY3, and CY4 respectively. The final result is Y having bits Y1, Y2, Y3, Y4, and Y5.

FIG. 2B illustrates the same ternary addition, but with actual numbers as examples. The input numbers are 11, 7, and 10 decimal or 1011, 0111, and 1010 binary. The sum vector yields 0110 and the carry vector yields 1011. The result is 11100 binary or 28 decimal, as expected.

The ternary structure is a significant enhancement to the implementation of adder trees. For example, if 64 numbers are added using a binary adder tree, there will be 6 levels of adders, with a total of 63 adders. In a ternary tree, this will reduce to 5 levels of adders with 32 individual adders. For a quaternary tree, this will require only 3 levels of adders, with a total of 21 adders. According to various embodiments, ternary adder trees are ½ the size and ⅔ the latency of binary adder trees. Quaternary adders are ⅓ the size and ½ the latency of binary adders. Quaternary adders do not require as many levels of logic as binary or ternary adders. In particular embodiments, quaternary adders allow more simultaneous processing of multiple inputs during the same clock cycle.

Figure 3:
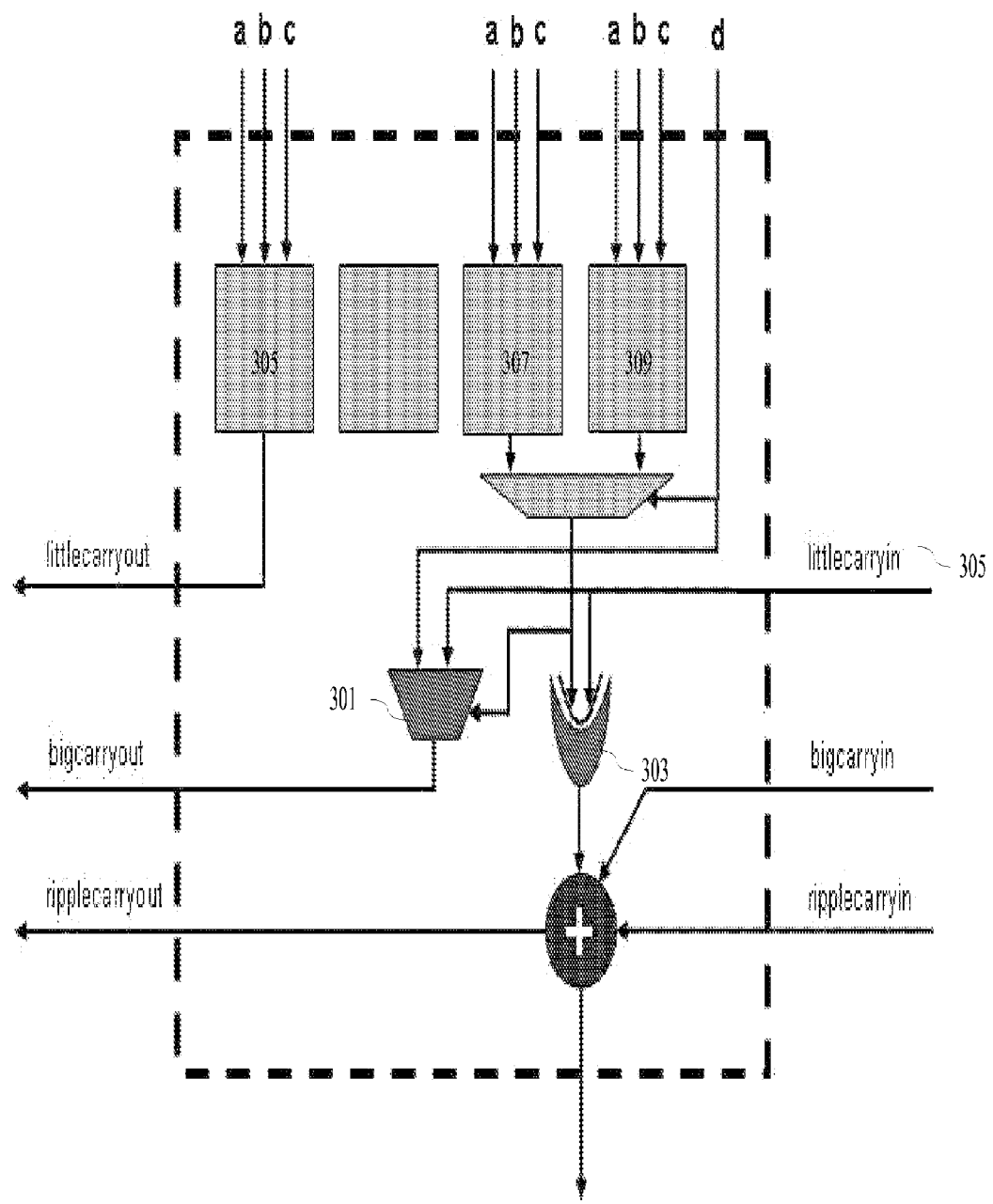
FIG. 3 illustrates one example of quaternary adder.

FIG. 3 illustrates an extension to a LUT structure to support quaternary adders. According to various embodiments, the LUT structure uses an ALUT included in half of an ALM. A single XOR gate 303 and a single 2 input multiplexer 301 is added to the LUT structure supporting the ternary adder. Three LUTs 305, 307, and 309 in the ALM are used. In particular embodiments, additional support logic includes the "littlecarryin" input 305 to the XOR gate 303 that will have to be ANDed to 0 when the quaternary mode is not used. The "littlecarry" signal 305 is the same majority function of three independent inputs as the "carryout" signal for the ternary case. The first part of the sum function now requires four independent inputs. Although each LUT supports functions of four independent inputs, the wiring and multiplexer pattern in the existing architecture may not support some patterns, and additional input multiplexing may be required.

FIG. 4A shows compression and addition operations for quaternary addition. According to various embodiments, there are four input numbers A, B, C, and D having bits A1, A2, A3, A4, B1, B2, B3, B4, C1, C2, C3, C4, D1, D2, D3, and D4 respectively. The first three inputs will be compressed to a sum and carry vector, SMA and CYA by a 3-2 compressor. SMA and CYA have bits SMA1, SMA2, SMA3, SMA4, CYA1, CYA2, CYA3, and CYA4 respectively. The result is then further compressed with the D input to generate sum and carry vectors SMB and CMB having bits SMB1, SMB2, SMB3, SMB3, CYB1, CYB2, CYB3, and CYB4 respectively. The carry propagate final result is Y having bits Y1, Y2, Y3, Y4, and Y5.

FIG. 4B illustrates the same quaternary addition, but with actual numbers as examples. The input numbers are 3, 7, 9, and 10 decimal and 0011, 0111, 1001, and 1101 binary. The SMA and CYA vectors yield 1101 and 0011 during 3-2 compression. The result is further compressed with the value 1010 to yield SMB and CYB vectors 0001 and 1110. The result Y is 11101 binary or 29 decimal, as expected.

Figure 5:
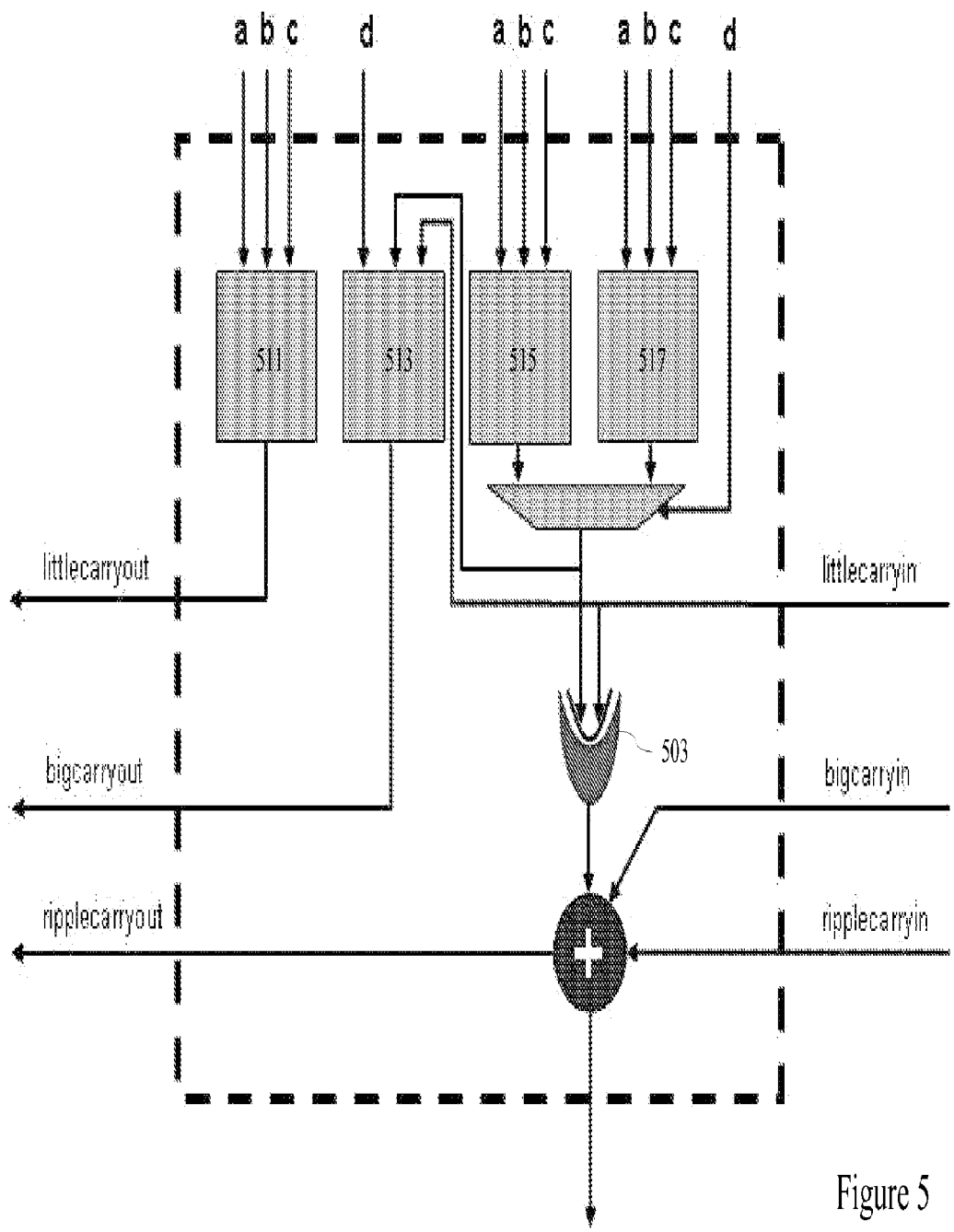
FIG. 5 illustrates a quaternary adder block diagram.

Although a quaternary adder can be implemented using only three of the four LUTs in a LUT structure, all four LUTs can also be used. FIG. 5 shows use of all four 3-1 input functions 511, 513, 515, and 517 to implement the 4-2 compressor. The 2-1 multiplexer added to a ternary adder structure is no longer required, although an XOR gate 503 is still needed. Although all four LUTs are used, the address multiplexing into the look up tables would be less efficient than the structure in FIG. 3 using three LUTs.

Figure 6:
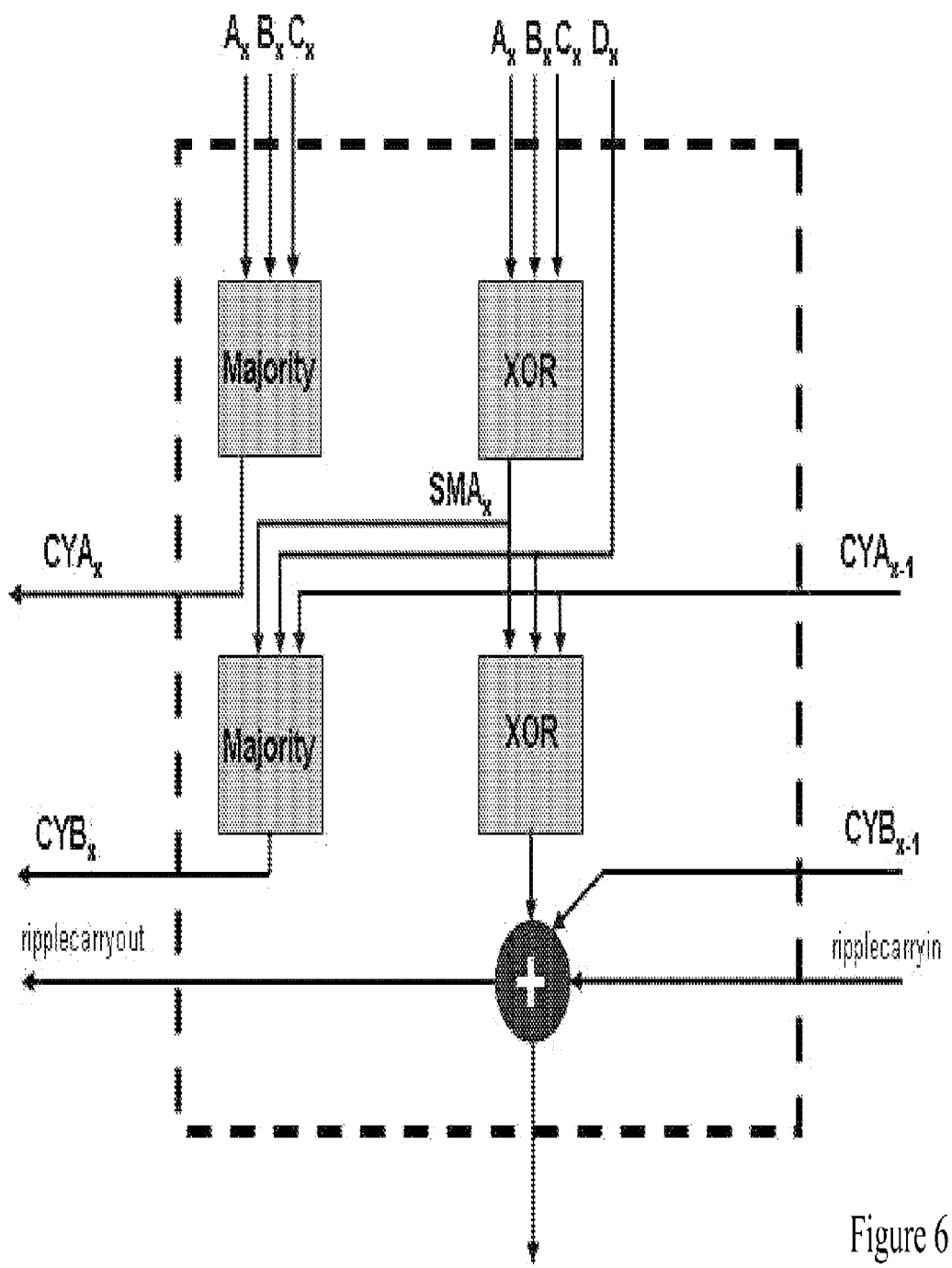
FIG. 6 illustrates a quaternary adder using 3:2 compressors.
Figure 7:
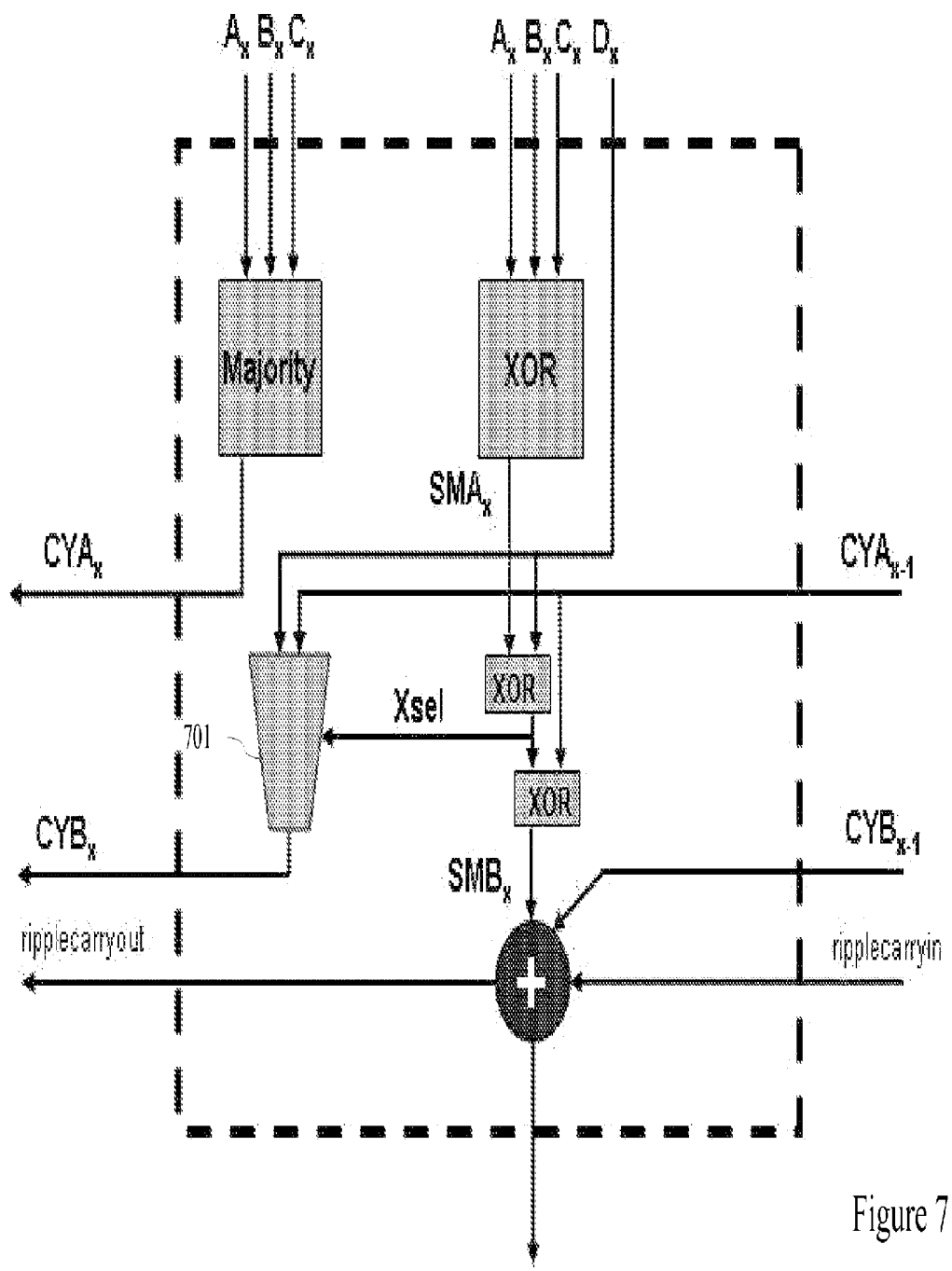
FIG. 7 illustrates another example of a quaternary adder.

FIGS. 6 and 7 indicate how the transformation from FIG. 5 into the more implemental FIG. 3 is realized. The majority decoder of the current column SMA, the previous column CYA, and the current column D, can be replaced by a binary selection (2-1 multiplexer 701) between the previous column CYA and the current column D, controlled by the current column SMB as shown in FIGS. 8A and 8B.

Figure 9:
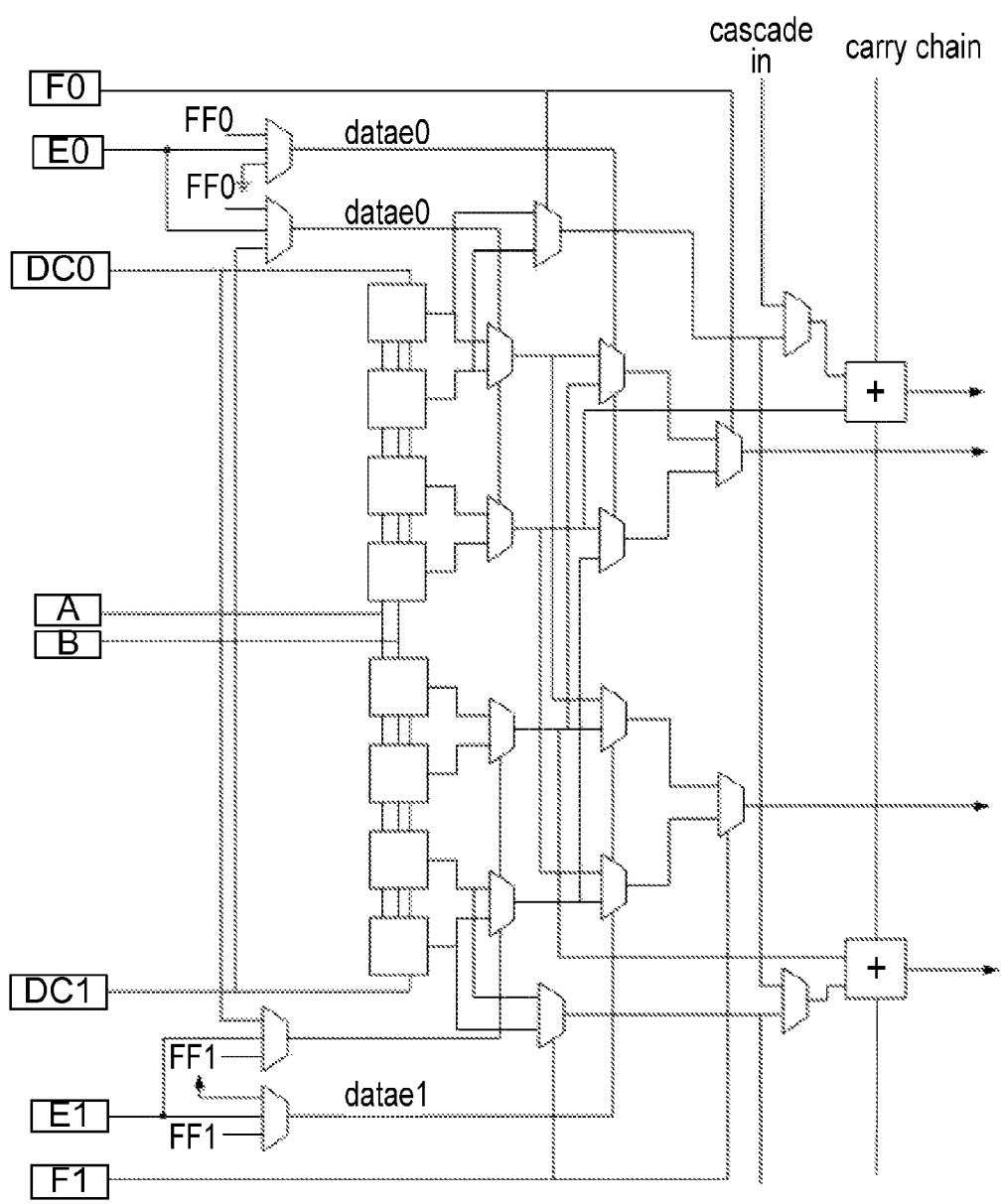
FIG. 9 illustrates one example of a lookup table.
Figure 10:
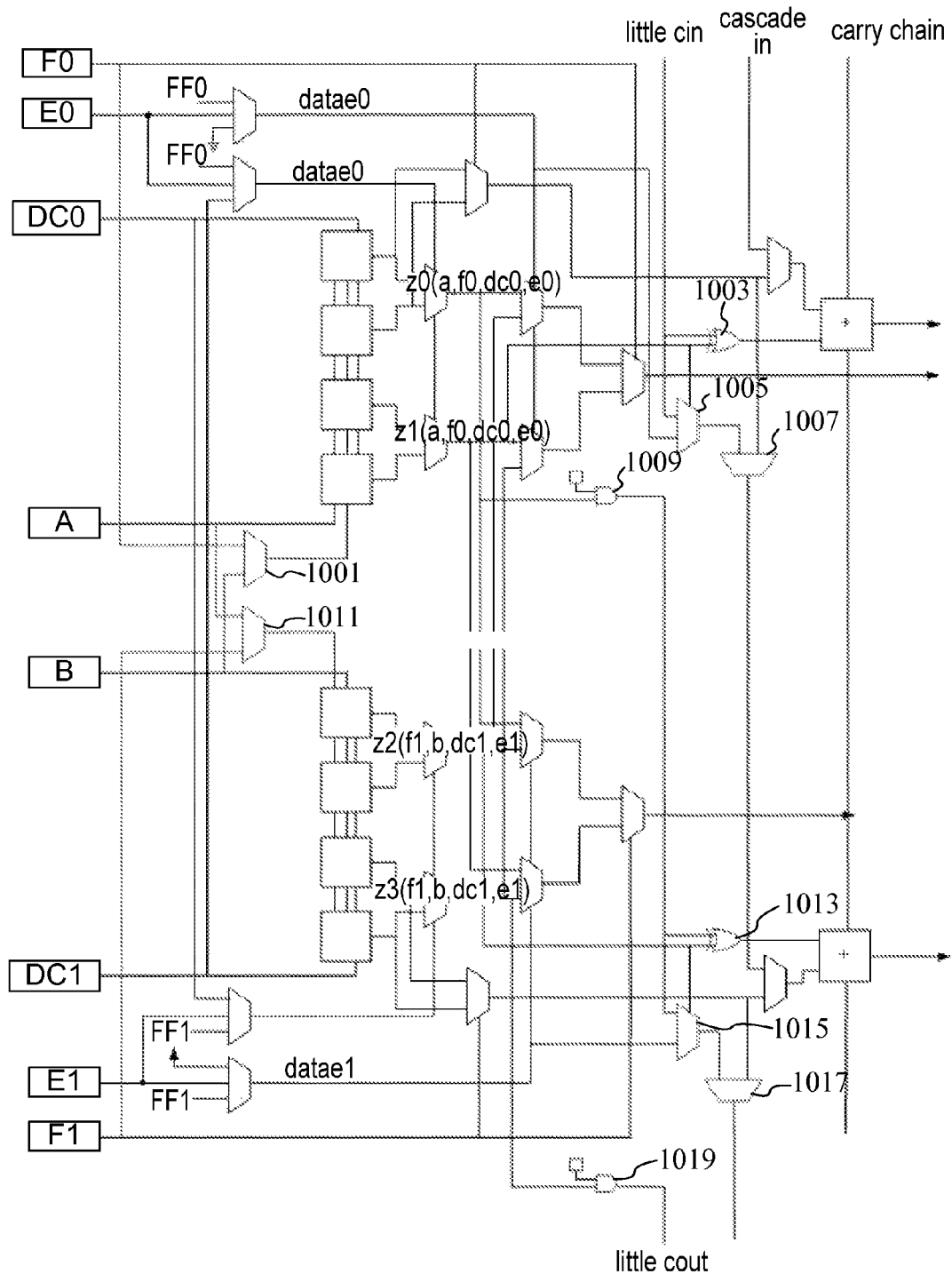
FIG. 10 illustrates one example of a lookup table with a quaternary adder.

FIG. 9 illustrates one example of an ALM supporting ternary adders. FIG. 10 illustrates one example of an ALM supporting quaternary adders. In particular embodiments, each ALM includes four 3LUTs. According to various embodiments, each 3LUT that makes up an ALUT (half ALM) has 3 independent inputs, but two of these inputs are the same as the other ALUT in the ALM. Two 2-1 multiplexers are needed to change the ALUT addressing to true 3 independent inputs. The other gates including XOR gates 1003 and 1013, after the 3LUTs, are as described above. The CYA signal (little cout) is the result of a 3 LUT, and AND gates 1009 and 1019 are used to control the forwarding of the CYA signal to the next ALUT. It should be noted that some LUT structures having true independent inputs need no additional multiplexers.

The quaternary cascade output signal is selected using multiplexer 1005 or 1015 from one of the external inputs into the ALUT and the previous ALUT's cascade output signal. Another 2-1 multiplexer 1007 or 1017 selects between the quaternary cascade output and the ternary cascade output, which is generated by one of the 3LUTs.

Figure 11:
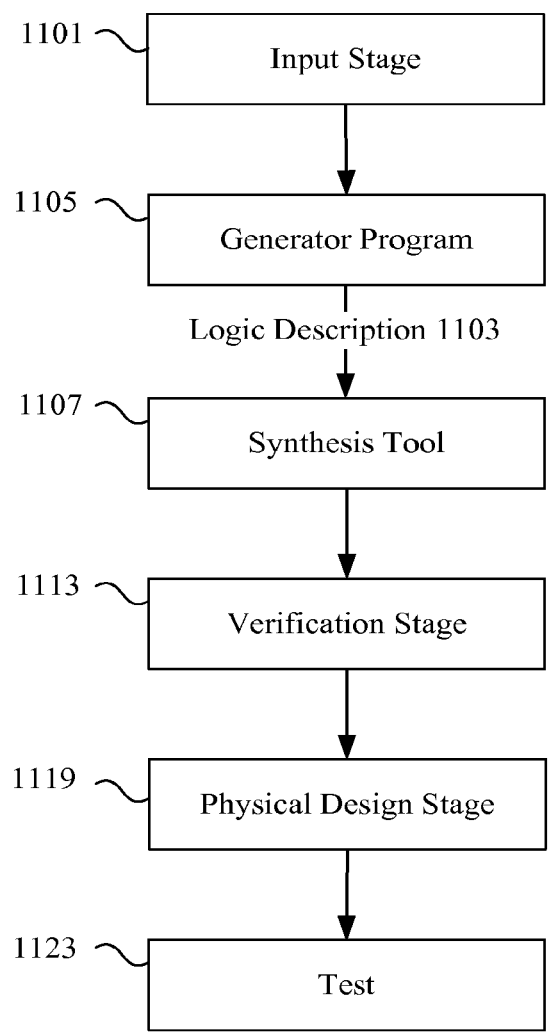
FIG. 11 illustrates a technique for implementing a device according to various embodiments.

FIG. 11 is a diagrammatic representation showing implementation of an electronic device having a lookup table structure including quaternary addersdecoder. Although the techniques and mechanisms of the present invention can be implemented on a variety of devices, applications are particularly useful in the context of programmable logic. An input stage 1101 receives selection information typically from a user for logic such as a processor core as well as other components to be implemented on an electronic device. In one example, the input received is in the form of a high-level language program. A generator program 1105 creates a logic description 1103 and provides the logic description along with other customized logic to any of a variety of synthesis tools, place and route programs, and logic configuration tools to allow a logic description to be implemented on an electronic device.

In one example, an input stage 1101 often allows selection and parameterization of components to be used on an electronic device. The input stage 1101 also allows configuration of variable or fixed latency support. In some examples, components provided to an input stage include intellectual property functions, megafunctions, and intellectual property cores. The input stage 1101 may be a graphical user interface using wizards for allowing efficient or convenient entry of information. The input stage may also be a text interface or a program reading a data file such as a spreadsheet, database table, or schematic to acquire selection information. The input stage 1101 produces an output containing information about the various modules selected.

In typical implementations, the generator program 1105 can identify the selections and generate a logic description with information for implementing the various modules. The generator program 1105 can be a Perl script creating HDL files such as Verilog, Abel, VHDL, and AHDL files from the module information entered by a user. The generator program 1105 also provides information to a synthesis tool 1107 to allow HDL files to be automatically synthesized. In some examples, a logic description is provided directly by a designer. Hookups between various components selected by a user are also interconnected by a generator program. Some of the available synthesis tools are Leonardo Spectrum, available from Mentor Graphics Corporation of Wilsonville, Oreg. and Synplify available from Synplicity Corporation of Sunnyvale, Calif. The HDL files may contain technology specific code readable only by a synthesis tool. The HDL files at this point may also be passed to a simulation tool 1109.

As will be appreciated by one of skill in the art, the input stage 1101, generator program 1105, and synthesis tool 1107 can be separate programs. The interface between the separate programs can be a database file, a log, or simply messages transmitted between the programs. For example, instead of writing a file to storage, the input stage 1101 can send messages directly to the generator program 1105 to allow the generator program to create a logic description. Similarly, the generator program can provide information directly to the synthesis tool instead of writing HDL files. Similarly, input stage 1101, generator program 1105, and synthesis tool 1107 can be integrated into a single program.

A user may select various modules and an integrated program can then take the user selections and output a logic description in the form of a synthesized netlist without intermediate files. Any mechanism for depicting the logic to be implemented on an electronic device is referred to herein as a logic description. According to various embodiments, a logic description is an HDL file such as a VHDL, Abel, AHDL, or Verilog file. A logic description may be in various stages of processing between the user selection of components and parameters to the final configuration of the device. According to other embodiments, a logic description is a synthesized netlist such as an Electronic Design Interchange Format Input File (EDF file). An EDF file is one example of a synthesized netlist file that can be output by the synthesis tool 1107.

A synthesis tool 1107 can take HDL files and output EDF files. Tools for synthesis allow the implementation of the logic design on an electronic device. Some of the available synthesis tools are Leonardo Spectrum, available from Mentor Graphics Corporation of Wilsonville, Oreg. and Synplify available from Synplicity Corporation of Sunnyvale, Calif. Various synthesized netlist formats will be appreciated by one of skill in the art.

A verification stage 1113 typically follows the synthesis stage 1107. The verification stage checks the accuracy of the design to ensure that an intermediate or final design realizes the expected requirements. A verification stage typically includes simulation tools and timing analysis tools. Tools for simulation allow the application of inputs and the observation of outputs without having to implement a physical device. Simulation tools provide designers with cost effective and efficient mechanisms for both functional and timing verification of a design. Functional verification involves the circuit's logical operation independent of timing considerations. Parameters such as gate delays are disregarded.

Timing verification involves the analysis of the design's operation with timing delays. Setup, hold, and other timing requirements for sequential devices such as flip-flops are confirmed. Some available simulation tools include Synopsys VCS, VSS, and Scirocco, available from Synopsys Corporation of Sunnyvale, Calif. and Cadence NC-Verilog and NC-VHDL available from Cadence Design Systems of San Jose, Calif. After the verification stage 1113, the synthesized netlist file can be provided to physical design tools 1119 including place and route and configuration tools. A place and route tool typically locates logic cells on specific logic elements of a target hardware device and connects wires between the inputs and outputs of the various logic elements in accordance with logic required to implement an electronic design. The device can also be physically tested at 1123.

For programmable logic devices, a programmable logic configuration stage can take the output of the place and route tool to program the logic device with the user selected and parameterized modules. According to various embodiments, the place and route tool and the logic configuration stage are provided in the Quartus Development Tool, available from Altera Corporation of San Jose, Calif. As will be appreciated by one of skill in the art, a variety of synthesis, place and route, and programmable logic configuration tools can be tested using various techniques of the present invention.

As noted above, different stages and programs can be integrated in a variety of manners. According to one embodiment, the input stage 1101, the generator program 1105, the synthesis tool 1107, the verification tools 1113, and physical design tools 1119 are integrated into a single program. The various stages are automatically run and transparent to a user. The program can receive the user selected modules, generate a logic description depicting logic for implementing the various selected modules, and implement the electronic device. As will be appreciated by one of skill in the art, HDL files and EDF files are mere examples of a logic description. Other file formats as well as internal program representations are other examples of a logic description.

Figure 12:
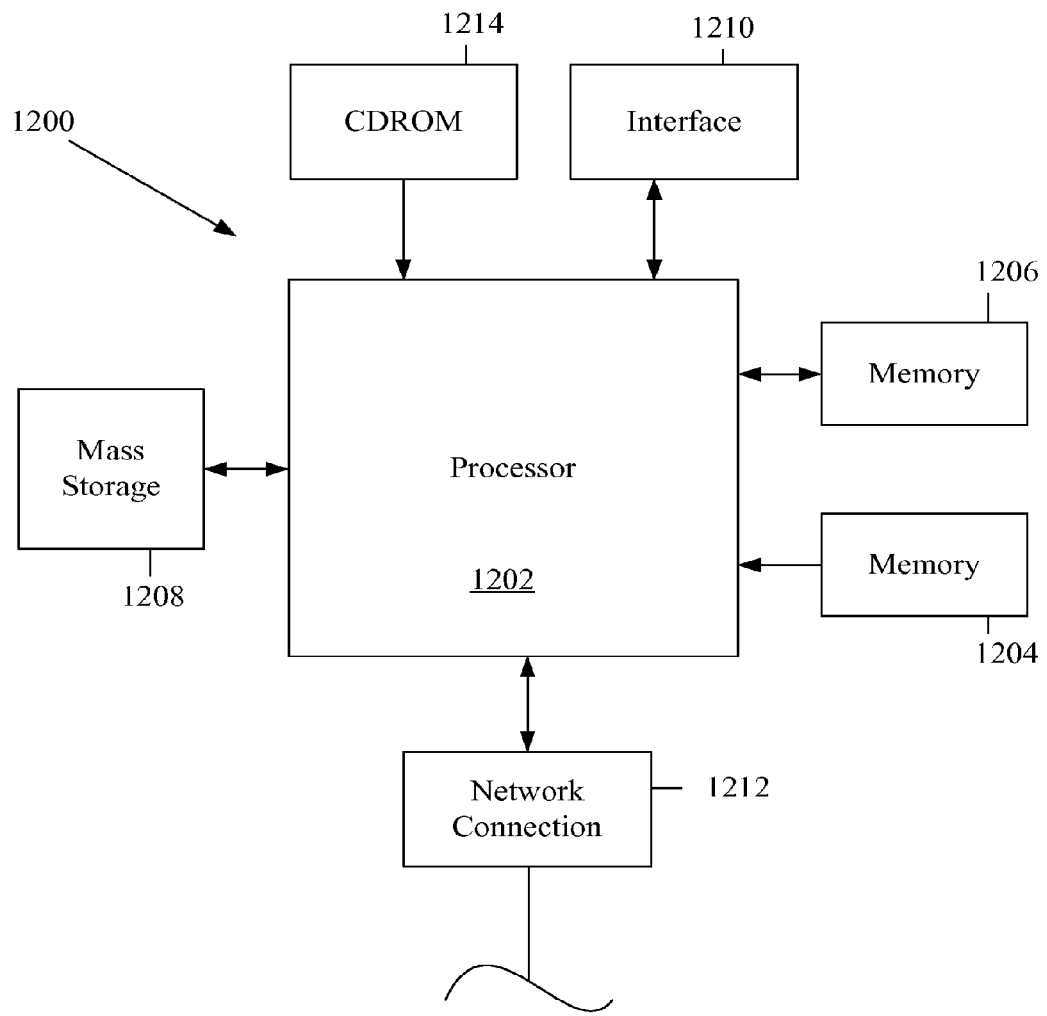
FIG. 12 illustrates an example of a system that can be used to implement various embodiments.

FIG. 12 is a diagrammatic representation showing a typical computer system that can be used to implement a programmable chip having a lookup table structure supporting quaternary adders. The computer system 1200 includes any number of processors 1202 (also referred to as central processing units, or CPUs) that are coupled to devices including memory 1206 (typically a random access memory, or "RAM"), memory 1204 (typically a read only memory, or "ROM"). The processors 1202 can be configured to generate an electronic design. As is well known in the art, memory 1204 acts to transfer data and instructions uni-directionally to the CPU and memory 1206 is used typically to transfer data and instructions in a bi-directional manner.

Both of these memory devices may include any suitable type of the computer-readable media described above. A mass storage device 1208 is also coupled bi-directionally to CPU 1202 and provides additional data storage capacity and may include any of the computer-readable media described above. The mass storage device 1208 may be used to store programs, data and the like and is typically a secondary storage medium such as a hard disk that is slower than memory. The mass storage device 1208 can be used to hold a library or database of prepackaged logic or intellectual property functions, as well as information on generating particular configurations. It will be appreciated that the information retained within the mass storage device 1208, may, in appropriate cases, be incorporated in standard fashion as part of memory 1206 as virtual memory. A specific mass storage device such as a CD-ROM 1214 may also pass data uni-directionally to the CPU.

CPU 1202 is also coupled to an interface 1210 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. The CPU 1202 may be a design tool processor. Finally, CPU 1202 optionally may be coupled to a computer or telecommunications network using a network connection as shown generally at 1212. With such a network connection, it is contemplated that the CPU might receive information from the network, or might output information to the network in the course of performing the above-described process steps. It should be noted that the system 1200 might also be associated with devices for transferring completed designs onto a programmable chip. The above-described devices and materials will be familiar to those of skill in the computer hardware and software arts.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of master and slave components and should not be restricted to the ones mentioned above. It is therefore intended that the invention be interpreted to include all variations and equivalents that fall within the true spirit and scope of the present invention.

What is claimed is:

1. A device, comprising:
   a plurality of logic modules including a first logic module and a second logic module, the first logic module configured to receive a first input bit, a second input bit, and a third input bit and output a first carry bit, the second logic module configured to receive the first input bit, the second input bit, and the third input bit and output a first sum bit;
   logic circuitry configured to receive a fourth input bit and the first sum bit to allow generation of a result bit for the quaternary addition of the first input bit, the second input bit, the third input bit, and the fourth input bit.

2. The device of claim 1, wherein the first logic module is configured to receive the first sum bit, the fourth input bit, and a previous rank first carry bit to generate a second carry bit.

3. The device of claim 2, wherein the logic circuitry includes XOR circuitry configured to receive the first sum bit, the fourth input bit, and a previous rank first carry bit for combination with a previous rank second carry bit to generate the result bit for the addition of the first input bit, the second input bit, the third input bit, and the fourth input bit.

4. The device of claim 2, wherein the first logic module and the second logic module reside in an adaptive logic module.

5. The device of claim 1, further comprising a multiplexer configured to receive the fourth input bit and a previous rank first carry bit to select a second carry bit.

6. The device of claim 5, wherein XOR circuitry comprises two XOR gates, the first XOR gate configured to receive the fourth input bit and the first sum bit to generate a selection bit to control the multiplexer.

7. The device of claim 6, wherein the second XOR gate is configured to receive the previous rank first carry bit and the selection bit to generate a second sum bit.

8. The device of claim 7, wherein the second sum bit is added with the previous rank second carry bit to generate the result bit for the addition of the first input bit, the second input bit, the third input bit, and the fourth input bit.

9. The device of claim 8, wherein the second sum bit is combined with the previous rank second carry bit and a previous rank ripple carry bit to generate a ripple carry bit.

10. The device of claim 1, wherein device is a programmable chip.

11. A logic circuitry including a quaternary adder, the logic circuitry comprising:
    a first logic circuitry configured to receive a first input bit, a second input bit, and a third input bit and output a first carry bit;
    a second logic circuitry configured to receive the first input bit, the second input bit, and the third input bit and output a first sum bit in the same clock cycle the first carry bit is output; and
    a third logic circuitry configured to receive a fourth input bit and the first sum bit to allow generation of a result bit for the addition of the first input bit, the second input bit, the third input bit, and the fourth input bit.

12. The logic circuitry of claim 11, further comprising a third logic circuitry configured to receive the first sum bit, the fourth input bit, and a previous rank first carry bit to generate a second carry bit.

13. The logic circuitry of claim 12, wherein the third logic circuitry includes XOR circuitry configured to receive the first sum bit, the fourth input bit, and a previous rank first carry bit for combination with a previous rank second carry bit to generate the result bit for the addition of the first input bit, the second input bit, the third input bit, and the fourth input bit.

14. The logic circuitry of claim 12, wherein the first logic circuitry, the second logic circuitry, and the third logic circuitry reside on the same level of logic.

15. The logic circuitry of claim 11, further comprising a multiplexer configured to receive the fourth input bit and a previous rank first carry bit to select a second carry bit.

16. The logic circuitry of claim 15, wherein XOR circuitry comprises two XOR gates, the first XOR gate configured to receive the fourth input bit and the first sum bit to generate a selection bit to control the multiplexer.

17. The logic circuitry of claim 16, wherein the second XOR gate is configured to receive the previous rank first carry bit and the selection bit to generate a second sum bit.

18. The logic circuitry of claim 17, wherein the second sum bit is combined with the previous rank second carry bit to generate the result bit for the addition of the first input bit, the second input bit, the third input bit, and the fourth input bit.

19. The logic circuitry of claim 18, wherein the second sum bit is combined with the previous ranking second carry bit and a previous rank ripple carry bit to generate a ripple carry bit.

20. The logic circuitry of claim 11, wherein logic circuitry is implemented using an adaptive logic module on a programmable chip.

21. A device, comprising:
first logic circuitry means configured to receive a first input bit, a second input bit, and a third input bit and output a first carry bit;
second logic circuitry means configured to receive the first input bit, the second input bit, and the third input bit and output a first sum bit in the same clock cycle the first carry bit is output;
third logic circuitry means configured to receive a fourth input bit and the first sum bit to allow generation of a result bit for the addition of the first input bit, the second input bit, the third input bit, and the fourth input bit.

* * * * *